United States Patent [19]
Raskin

[11] 3,837,222
[45] Sept. 24, 1974

[54] LOAD CELL
[75] Inventor: Seymour H. Raskin, Dallas, Tex.
[73] Assignee: Sands Measurement Corporation, Dallas, Tex.
[22] Filed: Aug. 15, 1972
[21] Appl. No.: 280,772

[52] U.S. Cl. .............................. 73/141 A, 177/211
[51] Int. Cl. ............................................. G01l 1/22
[58] Field of Search .......... 73/141 A; 177/211, 225, 177/229; 267/160, 163

[56] References Cited
UNITED STATES PATENTS

| | | | |
|---|---|---|---|
| 2,649,294 | 8/1953 | Walter | 267/160 X |
| 2,697,595 | 12/1954 | Walter | 267/160 X |
| 3,191,702 | 6/1965 | Kohlhagen | 177/229 |
| 3,489,381 | 1/1970 | Jones et al. | 267/160 X |

FOREIGN PATENTS OR APPLICATIONS

| | | | |
|---|---|---|---|
| 974,519 | 11/1964 | Great Britain | 73/141 A |

*Primary Examiner*—Charles A. Ruehl
*Attorney, Agent, or Firm*—Howard E. Moore; Gerald G. Crutsinger

[57] ABSTRACT

A load cell of the beam type having a planar operator member having a pair of parallel longitudinal slots defining a central beam member and a pair of parallel bearing members spaced outwardly of the beam member, the outer ends of the bearing members and of the beam member being integral with one another, the operator member having a pair of laterally outwardly extending support members positionable on a horizontal laterally spaced surface of a support block, the load or force to be measured being applied to the central portion of the beam member which is provided with strain measuring means such as strain gages at locations of flexure of the beam member. The support block may have a pair of transversely extending narrow edges underlying the central portions of the bearing members for preventing torsional movement of the bearing members as the load is applied to the beam member.

A modified form of the load cell has an operator member whose support members extend parallel to and longitudinally of the bearing members and are secured thereto by transverse connector members, the support members being secured at opposite ends to horizontal support surfaces of a support block, the connector members and the bearing members engaging transverse narrow edges of the support block whereby the support members may be prestresssed upwardly at their midpoints.

13 Claims, 12 Drawing Figures

LOAD CELL

This invention relates to load cells and more particularly to a load cell having a beam member and means for measuring the stress in the beam member at locations of flexure of the beam member.

An object of this invention is to provide a new and improved load cell for measuring forces with great accuracy over wide ranges of the forces.

Still another object is to provide a load cell of the beam type wherein a beam member, which deflects with the load which is to be measured, is supported by means which eliminate or minimize the imposition of extraneous forces on the beam member which would effect the accuracy of measurement of the load.

Another object is to provide a load cell which is of simple construction, easily assembled and provides great accuracy of measurement of the load being measured thereby.

An important object of the invention is to provide a load cell having a planar substantially rectangular operator member provided with a pair of longitudinal slots defining a central beam member and a pair of parallel longitudinal bearing members, the bearing members and the beam member being connected at their opposite ends and integral with one another, the bearing members being supportable on a support block, outwardly of the bearing members, by a pair of outwardly transverse connector portions.

Another object is to provide a load cell, of the type described, wherein the support block is provided with narrow support surfaces or edges extending transversely beneath the bearing members at their midpoints for preventing rotational movement of the bearing members about axes extending parallel to the longitudinal axis of the bearing members.

Still another object is to provide a load cell, of the type described, wherein there is no movement between the bearing members and the support members at the locations of contact of the bearing members with the support members so that there is no wear of either of the bearing members or the support members.

Still another object is to provide a load cell, of the type described, wherein the effective bending lengths of the bearing members are equal to the effective bending length of the beam member supported thereby and the effective combined width of the two support members is equal to the width of the beam member whereby the deflections of the bearing members with a given load are equal to the deflection of the beam member.

A further object is to provide a load cell of the type described wherein the support block has means for imposing a predetermined prestress on the bearing members.

Additional objects and advantages of the invention will be readily apparent from the following description of devices constructed in accordance with the invention, and reference to the accompanying drawings thereof, wherein.

Figure 1:
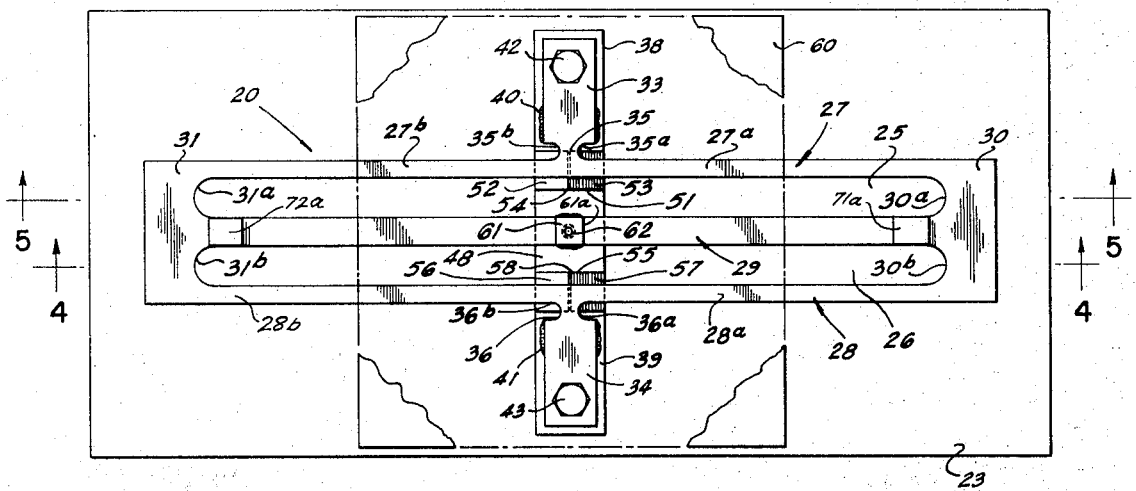
FIG. 1 is a plan view, with some parts broken away, of a load cell embodying the invention.
Figure 2:
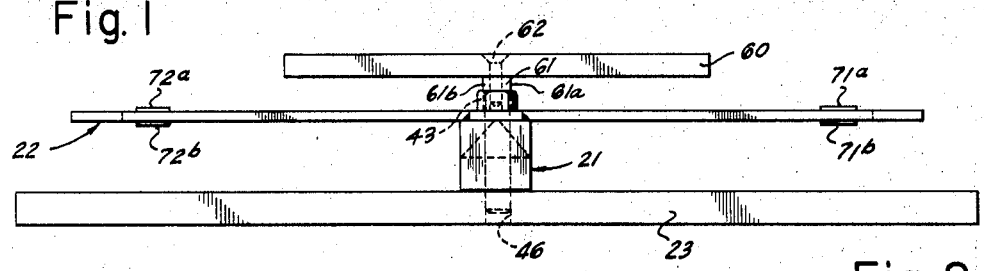
FIG. 2 is a side view of the load cell illustrated in FIG. 1.

Referring now particularly to FIGS. 1 through 6 of the drawings, the load cell 20 embodying the invention, which includes a support block 21 and an operator member 22, is shown in use as a weighing scale mounted on a suitable support, such as a rectangular plate 23 which may rest on a planar surface such as a table top or the like. The planar operator member 22, which is formed of steel or other suitable elastic substance, is substantially rectangular in shape and is provided with a pair of parallel longitudinal slots 25 and 26 which define parallel outer bearing members 27 and 28 and a central beam member 29. The outer ends of the central beam member are secured to the outer ends of the bearing members 27 and 28 by the end portions 30 and 31 of the operator member. The width of the beam member 29 is preferably equal to the combined widths of the bearing members 27 and 28, for a reason to be discussed below.

The operator member 22 is supported on the block 21 by means of the laterally outwardly extending support members 33 and 34 thereof which are disposed outwardly of the central portions of the bearing members 27 and 28 and are connected thereto by the connector members 35 and 36 which are of lesser width than the widths of the support members.

The support members 33 and 34 rest on the upwardly facing horizontal surfaces of the end portions 38 and 39 of the support block which are disposed outwardly of the bearing members 27 and 28 respectively of the operator member 22.

The support members 33 and 34 may be secured to the block end portions 38 and 39 by means of welds 40 and 41 or may also be secured by means of bolts 42 and 43 which extend downwardly through aligned apertures in the support members 33 and 34 and in the end portions 38 and 39 of the support block into threaded bores 46 of the base 21.

The support block is provided with a central slot or groove 48 to permit downward deflection of the central portion of the beam member 29. A substantially triangular portion 51 of the block is defined by the surfaces 52 and 53 which extend convergently upwardly to provide a horizontal very narrow knife edge or surface 54 which is engaged by the central portion of the bearing member 27 and of the connector portion 35 of the operator member. Similarly, on the other side of the central groove 48, the block has a substantially triangular portion 55 defined by the upwardly convergent surfaces 56 and 57 which converge upwardly to provide a narrow edge or support surface 58 which is engaged by the transversely central portion of the bearing member 28 and the connector portion 36 of the operator member.

The edges 54 and 58 lie in the same horizontal plane as the top surfaces of the end portions 38 and 39 of the support blocks.

When the load cell is to be used in a scale, a platform 60, on which objects to be weighed are placed, is connected to the central portion of the beam member 29 by a support block 61 whose bottom surface rests on the central portion of the beam member 29 and is secured thereto in any suitable manner, as by welding. The width of the support block 61 is equal to the width of the connector portions 35 and 36 for a reason to be described below. The platform 60 may of course be connected to the block 61 in any suitable manner, as by means of a screw 62 which extends through a suitable aperture in the platform into an upwardly opening threaded bore of the support block.

Figure 4:
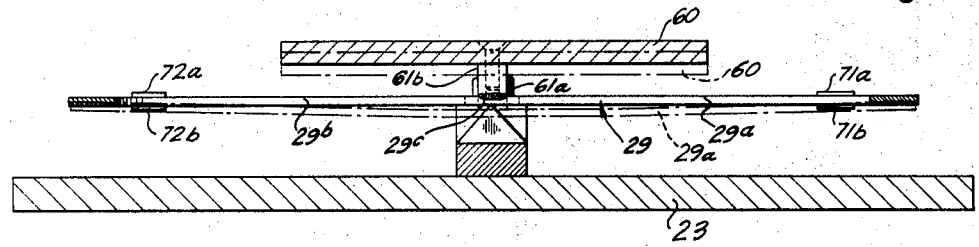
FIG. 4 is a sectional view taken on line 4—4 of FIG. 1.
Figures 5, 6:
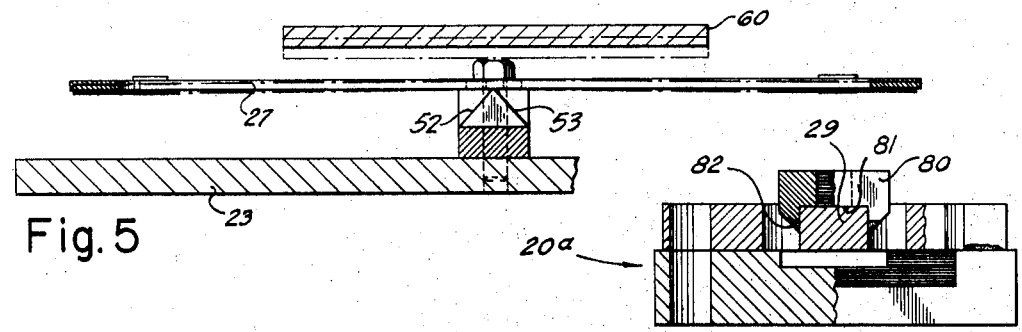
FIG. 5 is a sectional view taken on the line 5—5 of FIG. 1.
FIG. 6 is a transverse, partly sectional, view of the modified form of the load cell.

It will be apparent, as illustrated in FIG. 4, that the beam member 29 will deflect downwardly as a load is placed on the platform 60 to a position such as illustrated in broken lines in FIG. 5 and that this downward force will also cause the outer ends of the bearing members 27 and 28 to move downwardly since the downward force exerted by the load is transmitted to the outer opposite end portions of the bearing members 27 and 28 by the end portions 30 and 31 of the operator member. The opposite ends of the bearing members will move downwardly, as illustrated in broken lines in FIG. 5, as a load is imposed on the platform.

It will be apparent that the portion 27a of the bearing member 27 which extends from substantially the arcuate side surface 35a of the connector member 35 to the surface 30a of the connector end portion 30 of the operator member may bend or act as a spring and, similarly, the other end portion 27b of the support member 27 which extends substantially from the side surface 35b of the connector portion 35 to the surface 31a of the end portion 30 also acts as a spring. The combined width of the bearing member 27 and the connector member 35 are such that, for the usual or normal loads imposed on the beam member 29 by objects whose weight is to be determined and placed on the platform 60, no significant bending can occur of the connector portion 35 and of the central portion of the bearing member 27. As a result, bending of the bearing member 27 may take place only along the portions 27a and 27b thereof. Similarly, the bending of the other bearing member 28 may occur only along the portions 28a and 28b thereof extending between the surfaces 36a and 30b and the surfaces 36b and 31b. The deflection or bending of the beam member 29 takes place along the portions 29a and 29b thereof between the sides 61a and 61b of the platform support block 61 and the end surfaces 30a, 30b, 31a and 31b, respectively, defining the outermost ends of the slots 25 and 26. The width of the support block 61 between its sides 61a and 61b is made substantially equal to the width of the connector portions 35 and 36. It will thus be apparent since the block post 61 rigidifies the central portion 29c of the beam, the combined bending lengths of the portions 29a and 29b of the beam 29 are substantially equal to the combined bending lengths of the portions 27a and 27b of the bearing members 27 and 28. Since, in addition, the combined widths of the bearing members 27 and 28 are equal to the width of the beam member 29, the stresses imposed on the bearing members will be equal to the stresses imposed on the beam member 29. This uniformity in stress forces results in the stresses at the top and bottom surfaces of the beam 29 at the locations of the pairs of strain gages 71a and 71b and 72a and 72b to vary substantially linearly with the load and, therefore, the combined resistances of the strain gages vary with the load in a manner easily convertible to a direct reading of the load.

The strain gages are preferably bonded to the beam member at the locations of flexure thereof to cause them to be free of extraneous forces such as those caused by torsional forces. As shown in the drawing, the strain gages are located just inwardly of the inward ends of the arcuate surfaces 30a, 31a, and 30b, 31b defining the opposite ends of the slots 25 and 26, respectively.

Figures 3, 6A:
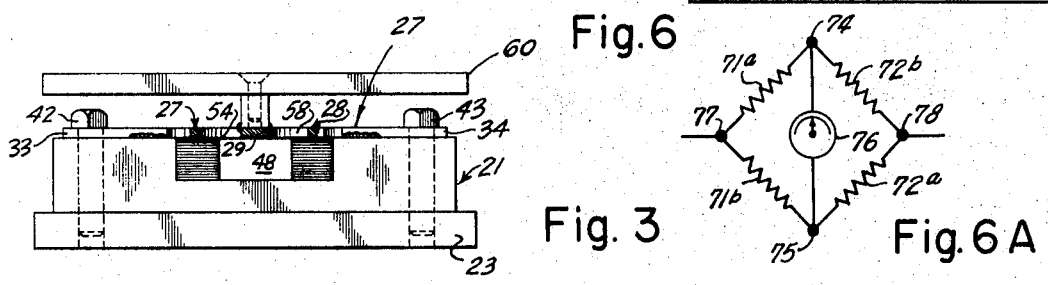
FIG. 3 is an end view of the load cell illustrated in FIG. 1.
FIG. 6A is a diagramatic illustration of the manner in which the stress measuring means of the beam member of the load cell are connected in an electric circuit to provide an output signal which varies in accordance with the load imposed on the beam member.
Figure 7:
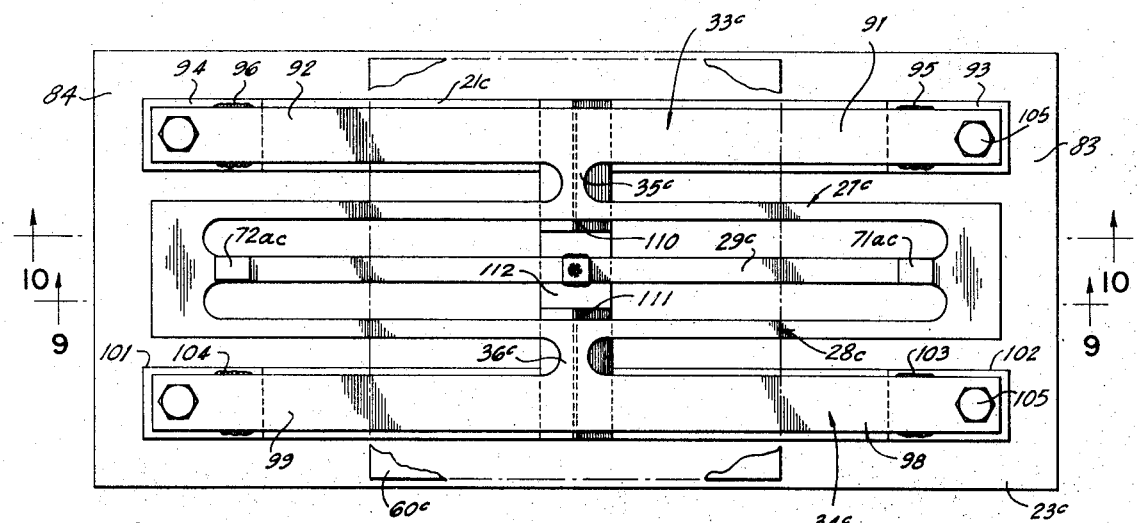
FIG. 7 is a plan view with some parts broken away of a modified form of the load cell.
Figure 8:
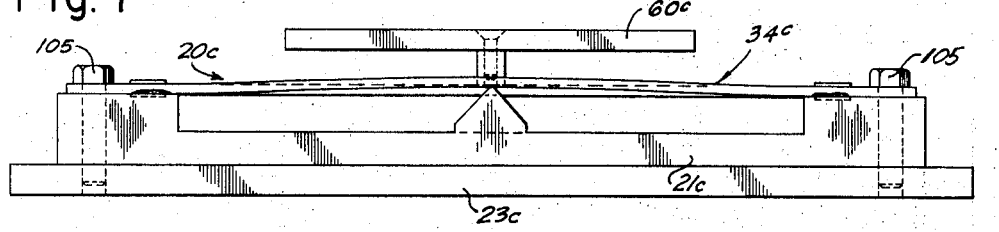
FIG. 8 is a side view of the load cell illustrated in FIG. 7.
Figure 9:
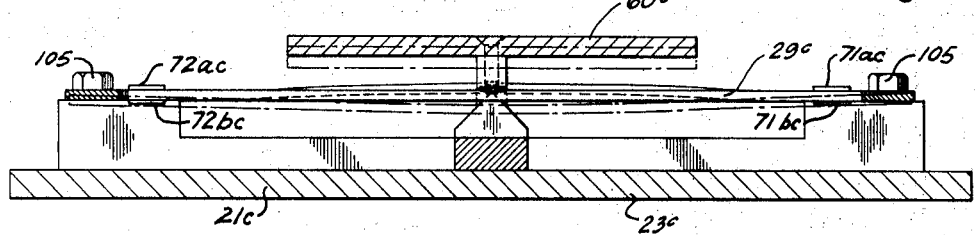
FIG. 9 is a sectional view taken on line 9-9 of FIG. 7.
Figure 10:
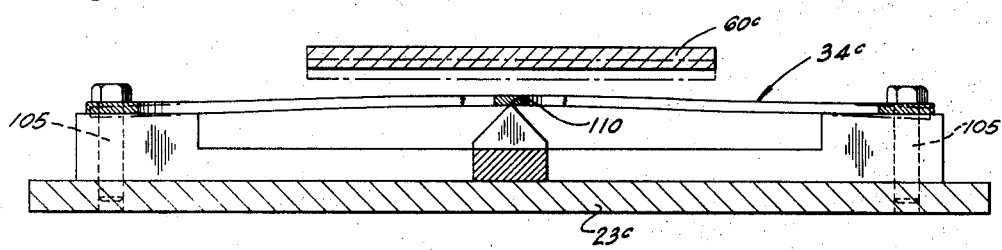
FIG. 10 is a sectional view taken on line 10—10 of FIG. 7.
Figure 11:
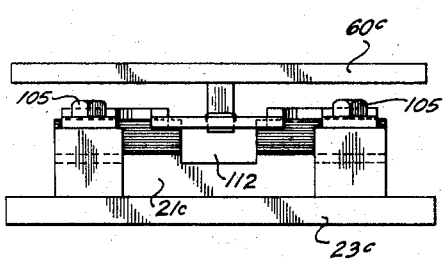
FIG. 11 is an end view of the load cell illustrated in FIG. 7.

These strain gages are connected in a Wheatstone bridge circuit, as illustrated in FIG. 6a, so that the resistances of the gages 71a and 72a increase, mounted on upper surfaces of beam member 29 (FIGS. 1 and 2), increase and the resistances of the gages 71b and 72b, mounted on bottom surfaces of beam member 29, decrease as the beam member deflects downwardly relative to the end portions 30 and 31 of the operator member to cause increase in the flow of current between the output terminals 74 and 75 of the bridge between which any suitable indicator device such as an ammeter 76 may be connected. The input points 77 and 78 are of course connectible across a source of direct current in the usual manner.

While the output of the Wheatstone bridge has been shown applied to an indicator device, it will be apparent that its input may be applied to a computer or control device to cause operation of the computer to indicate the weight or control the operation of some other control device.

The surfaces 54 and 58 support the central portions of the bearing members 27 and 28 against any torsional movement thereof as indicated in FIG. 3. The end portions 30 and 31 of the operator member similarly tend to limit or prevent imposition of torsional forces to the outer portions of the outer ends of the beam and bearing members. The surfaces 54 and 58 are not provided for the vertical support of the operator member 22, this function being performed by the connector portions 35 and 36, nor do they provide for the support of the bearing members 27 and 28, this function also being performed by the connector portions 35 and 36.

As a result, the portions 27a and 27b and 28a and 28b of the bearing members on opposite sides of the connector members 35 and 36 and the beam portions 29a and 29b are free to bend in accordance with the load imposed on the beam member by an object or load deposited on the platform 60 to produce a linear variation with load or the output of the Wheatstone bridge over wide ranges of the load and also extreme accuracy of variation of this output of the Wheatstone bridge with load is achieved.

Due to the support of the bearing members outwardly of their outside longitudinal edges so that the bending portions 27a and 27b and 28a and 28b are free to deflect or bend downwardly from opposite ends of the connector members or portions 35 and 36, which are integral with the bearing members, no extraneous forces or stresses are imposed on the bearing members which would tend to make the flexure of the beam member non-linear with load.

In certain applications it may not be necessary to provide the surfaces 54 and 58 to resist the imposition of torsional forces as, for example, in the case where the loads are of limited ranges or if the connector portions 35 and 36 are made relatively wide as compared to the lengths of the bearing members 27 and 28.

Referring now particularly to FIG. 6 of the drawings, the load cell 20a is a modified form of the load cell 20. The load cell 20a differs from the load cell 20 only in that the support post 80 is of different form and mounted in a slightly different manner on the beam member 29. The support post 80 is provided with a downwardly opening slot 81 in which the upper portion of the beam member 29 is received and is secured thereto by welds 82 so that the location of connection of the post 80 is substantially at the neutral axis of the weigh beam member 29, with the horizontal plane in which lies the neutral axis passing intermediate the top and bottom ends of the welds, thus minimizing any extraneous forces which may be imposed by the welds on the beam member as it deflects with load.

Referring now particularly to FIGS. 7 through 11 of the drawings, the load cell 20c is similar to the load cell 20 and, accordingly, its elements have been provided with the same reference numerals to which the subscript "c" has been added, as the corresponding elements of the load cell 20. The load cell 20c differs from the load cell 20 principally in that an upward prestress is imparted to its bearing members 27c and 28c and the connector portions 35c and 36c. The support member 33c has portions 91 and 92 which extend longitudinally in opposite directions to the end portions 83 and 84 of the support block 21c and rest on the top horizontal surfaces thereof. The extreme end portions of the portions 91 and 92 are secured to the support block portions 93 and 94, respectively. Similarly, the support member 34c has longitudinal portions 98 and 99 which extend longitudinally in opposite directions from the connector member 36c and are secured to the end portions 102 and 101 of the support block by means of welds 103 and 104, respectively.

The support block is secured to a base plate 23c by means of bolts 105 which extend through aligned apertures in the support members 33c and 34c and the four end portions of the support block into threaded bores of the base plate.

The support block has central very narrow support surfaces 110 and 111 on opposite sides of its central groove 112, which engage the transverse central portions of the support members 33c and 34c, the connector portions 35c and 36c and the bearing members 27c and 28c, respectively. The surfaces 110 and 111 lie in a common plane which is spaced upwardly of the plane in which lie the top surfaces of the support block portions 93, 94, 101 and 102 so that an upward central stress is applied to the connector members and the bearing members.

As a result, the strain gages 71ac, 71bc, 72ac and 72bc have stresses applied thereto so that the Wheatstone bridge under no load conditions is unbalanced.

The load cell 20c may be used where extremely light loads are to be measured using extremely thin operator members, the prestress insuring that predictable contact is maintained between the connector portions 35c and 36c and the surfaces 110 and 111. Further the load cell 20c has the welds 95 and 96 on support member 33c removed as far as practical from the connector portion 35c to avoid welding stresses in the connector portion as a result of welding a thin operator member.

It will now be apparent that a new and improved load cell has been illustrated and described which is of very simple structure and which has an operator member whose beam member deflects with load and the stress in which is measured or detected by suitable means, such as strain gages.

It will further be seen that the operator member is isolated or protected from extraneous forces which would impair the accuracy of the output of the load cell, especially over wide ranges of load imposed thereon.

It will also be seen that an applied load places half of the total strain gages in tension and half of the strain gages in compression, so that any non-diversity of the strain gages which are in tension will be offset by an equal amount of non-diversity of the strain gages which are in compression, thereby producing a linear output from the combined strain gages.

It will also be seen that while the load cell described herein has been shown in all cases to be subjected to a downwardly vertical load, the load cell may be used to measure an upwardly vertical load, in which case of upward load the signal from the Wheatstone bridge will have a polarity opposite to that for downward load.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A load cell including: a substantially rectangular planar operator member having a pair of parallel longitudinal slots providing a central beam member, a pair of bearing members spaced from and parallel to said beam member and end portions connecting outer ends of said beam and bearing members, said operator member including a pair of support members spaced outwardly of the bearing members and connected at the longitudinally central portions of the bearing members for supporting the operator members, said beam member having a central portion adapted to have a force transmitted thereto.

2. The load cell of claim 1, and a support block disposed below the operator member and having end support portions providing fixed horizontal support surfaces lying in a common horizontal plane, said support members resting on and rigidly secured to said support surfaces.

3. The load cell of claim 2, wherein said operator member has connector portions of lesser width than said support members connecting the bearing members to said support members.

4. The load cell of claim 3, wherein said support block has narrow edge surfaces extending inwardly of said support surfaces lying in the said horizontal plane and extending below and engaging said connector members and bearing members.

5. The load cell of claim 4, wherein the combined widths of said bearing members are equal to the width of said beam member.

6. The load cell of claim 3, wherein said connector portions partially overlie said support surfaces and extend inwardly of inner ends of said support surfaces.

7. The load cell of claim 6, wherein said beam member has connector means at said central portion for transmitting a force thereto.

8. The load cell of claim 7 wherein said connector means comprises a post member having a downwardly opening slot in which said beam member is receivable.

9. The load cell of claim 8 wherein said post member is secured to the sides of said beam by welds.

10. The load cell of claim 9, wherein the neutral axis of said beam members extends between and spaced from the top and bottom ends of said welds.

11. A load cell including: a substantially rectangular planar operator member having a pair of parallel longitudinal slots providing a central beam member, a pair of bearing members spaced from and parallel to said beam member and end portions connecting outer ends of said beam and bearing members, said operator member including a pair of support members spaced outwardly of the bearing members and connected at the longitudinally central portions of the bearing members for supporting the operator member, said beam member having a central portion adapted to have a force transmitted thereto; and a support means disposed below the operator member providing fixed horizontal support surfaces lyng in a common horizontal plane, said support members resting on and rigidly secured to said support surfaces.

12. The load cell of claim 11, wherein said operator member has connector portions of lesser width than said support members connecting the bearing members to said support members.

13. The load cell of claim 12, wherein said support means has narrow edge surfaces extending inwardly of said support surfaces lying in the said horizontal plane and extending below and engaging said connector portions and bearing members.

* * * * *